July 21, 1959  R. W. HEMPHILL, JR  2,895,206
APPARATUS FOR PRODUCING ROUGHENED SURFACE
GLOVE FORMS OR THE LIKE
Filed Dec. 29, 1955  2 Sheets-Sheet 1
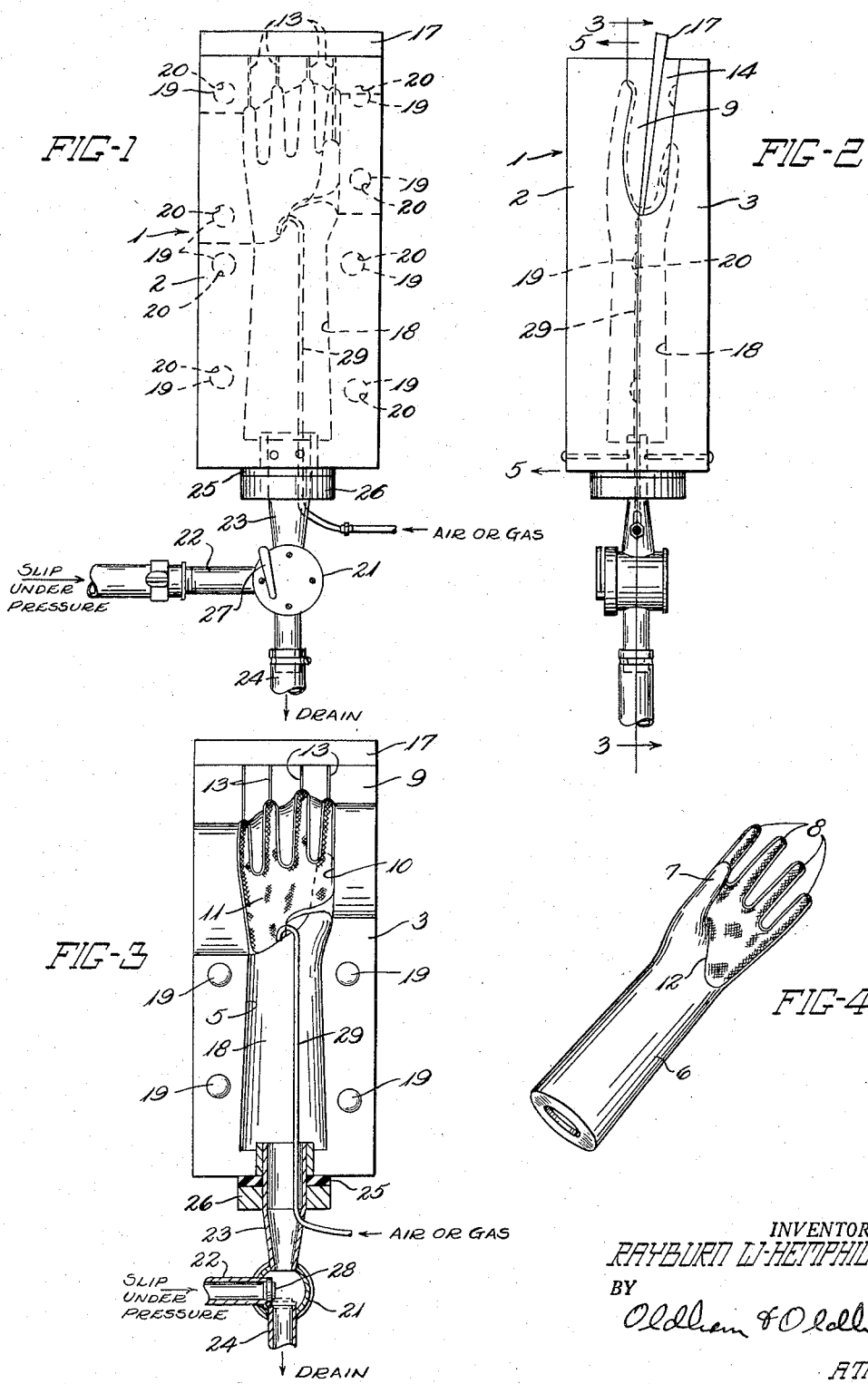
INVENTOR.
RAYBURN W. HEMPHILL, JR.
BY
Oldham & Oldham
ATTYS.

July 21, 1959   R. W. HEMPHILL, JR   2,895,206
APPARATUS FOR PRODUCING ROUGHENED SURFACE
GLOVE FORMS OR THE LIKE
Filed Dec. 29, 1955   2 Sheets-Sheet 2

INVENTOR.
RAYBURN W. HEMPHILL JR.
BY
Oldham & Oldham
ATTYS

United States Patent Office 2,895,206
Patented July 21, 1959

2,895,206

APPARATUS FOR PRODUCING ROUGHENED SURFACE GLOVE FORMS OR THE LIKE

Rayburn W. Hemphill, Jr., Akron, Ohio

Application December 29, 1955, Serial No. 556,188

9 Claims. (Cl. 25—129)

This invention relates to the provision of roughened surface glove forms or similar articles and especially to apparatus for producing such glove forms from porcelain or similar material.

Heretofore there has been quite a demand for porcelain dipping forms used in making gloves. Some of such forms have had special roughened surfaces, or designs provided thereon, which roughened surfaces or designs provide complementary shaped roughened surfaces or designs upon gloves produced by dipping the roughened surface porcelain form into liquid latex, or similar liquid preparations of rubber or rubber-like material which deposits upon the form to produce the desired rubber article. The article, when completed, is easily stripped from the form.

Certain of such roughened surface dipping forms have heretofore been made by the processes disclosed in United States Letters Patents Numbers 2,581,248 and 2,581,249. Such patents disclose relatively complicated, lengthy processes involving an appreciable amount of hand work and the use of special roughened patches to make the roughened surface glove dipping forms.

The apparatus of the invention may be used in a method characterized by the forcing of clay slip into a multi-section mold under pressure, retaining the clay slip under pressure to deposit it over all surfaces of the mold, and the release of excess slip material from the mold, after a layer of clay is deposited in the mold cavity, by a gas jet introduced into the mold cavity.

Another object of the invention is to use a multi-section mold in making roughened surface glove forms wherein the mold sections will come apart and be readily disengageable from the roughened surface dipping form produced in the cavity of the mold.

Another object of the invention is to provide a novel and improved sectional mold for producing a porcelain glove dipping form or the like therein, and wherein several mold sections have a roughened surface or designed carrying area provided thereon.

Another object of the invention is to use a mold which has a wedge member therein used in association with two mold sections and wherein the wedge extends the complete length of the mold sections and holds them in operative position and completes the mold cavity.

A further object of the invention is to provide a mold by which clay forms can be provided with roughened surfaces, and wherein the mold sections can be moved away normally from such roughened surfaces after the clay form is produced.

A further object of the invention is to provide apparatus for readily forcing liquid clay slip into a mold cavity, and for draining the excess material from the mold cavity after an article is formed therein, which apparatus also facilitates breaking the vacuum provided in the mold cavity when an article is formed therein by deposit of clay from the originally liquid clay slip material in the mold cavity.

The foregoing and other objects and advantages of the invention will be made more apparent as the specification proceeds.

Reference now should be had to the accompanying drawings wherein:

Fig. 1 is an elevation of apparatus used for practicing the principles of the invention;

Fig. 2 is a side elevation of the apparatus of Fig. 1;

Fig. 3 is a section taken on line 3—3 of Fig. 2;

Fig. 4 is a perspective view of a roughened surface glove dipping form produced in accordance with the principles of the invention;

When referring to corresponding parts shown in the drawings and referred to in the specification, corresponding numerals are used to facilitate comparison therebetween.

The present invention in general relates to an apparatus for molding a clay glove form having a roughened surface thereon by use of a mold having a roughened surface on a portion of the mold cavity, and wherein the mold is made from a mold section having a cavity defining the back of a glove form and four fingers thereof, a second mold section having a cavity defining the front of the glove form and a front thumb portion thereof, a thin mold member having a cavity defining the inner surface of the thumb portion of the form, a second thin mold member having a roughened cavity defining surface forming the front of the palm and finger areas of the form, and a wedge member positioned intermediate the mold members and extending the length thereof to force the mold members tightly against the mold sections and to complete the mold cavity.

Figure 5:
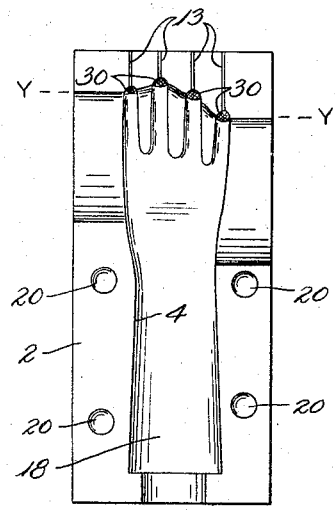
Fig. 5 is an elevation of the mold section taken on line 5—5 of Fig. 2.

Reference now should be had to the details of the structure shown in the accompanying drawings, and a multi-section mold of the invention is indicated as a whole by the numeral 1. The mold 1 is made from two primary parts including a back section 2 and a front section 3 which in general combined to define, substantially, a cavity for producing a glove form therein. This glove form is to have four separate, aligned fingers provided thereon, together with a protruding thumb portion lying out of the plane of the four fingers of the glove form so that the form is of the shape of a person's hand when normally positioned. Fig. 5 thus shows the back section 2 and that a cavity 4 is provided therein which cavity in general defines the back of a glove form and the back of four finger portions for the form. The front mold section has a mold cavity 5 therein that primarily defines the front of a glove form and the front of a thumb portion for the glove form. A hollow glove form 6 is shown in Fig. 4 to illustrate one type of article that can be produced by the mold and method of the invention wherein the glove form 6 includes a protruding thumb 7 thereon and four fingers indicated at 8 which fingers all lie in a plane from which the thumb 7 is spaced appreciably, as best indicated in Fig. 2 of the drawings. The thumb 7 may be stated to overhang or to be parallel and spaced from the palm area of the form.

Figure 7:
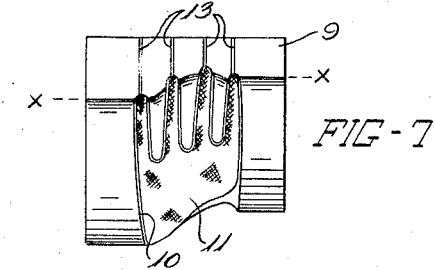
Fig. 7 is an elevation of the finger and palm completion portion of the mold.
Figure 8:
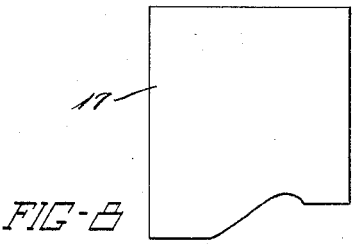
Fig. 8 is an elevation of the wedge member used in the mold.
Figure 6:
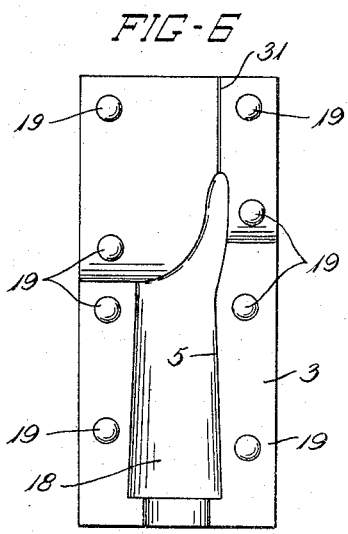
Fig. 6 is an elevation of the mold section shown in Fig. 3 with a mold part removed therefrom.
Figure 9:
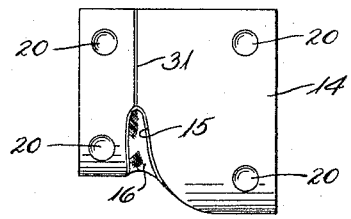
Fig. 9 is an elevation of the thumb completion portion of the mold.

As an important feature of the invention and to provide a cavity defining means for forming the remainder of the glove form 6, a relative thin mold member 9 is provided for being positioned in immediate association with a front portion of the back mold section 2 to comlete the definition of the fingers forming cavity areas of the mold 1. Such finger mold member 9 has a cavity 10 provided therein and substantially all of such a mold cavity has a design or a roughened surface 11 provided thereon, as best indicated in Fig. 7. Such a design or roughened surface area 11, which is shaped complementary to the actual design or surface to be provided on the glove form 6 as indicated thereon at 12, may be of any suitable contour. Vents 13 are provided at the upper ends of the finger cavity portions of the finger mold member 9 to permit any entrapped air to escape from the assembled mold 1.

14 indicates a thumb back mold member having a cavity 15 therein for defining what is called the thumb back of the glove form 6 and which is the portion of the thumb positioned immediately adjacent the fingers thereof. The cavity 15 has a designed or roughened surface area 16 provided thereon covering substantially the entire cavity area. It will be seen that the lower edges of both the finger mold member 9 and the thumb back mold member 14 are contoured, or curved and that the mold members 9 and 14 can be positioned in back to back relationship and have the same contour provided on the lower edges thereof. The actual cavity provided in the mold 1 is completed by means of a wedge member 17 of the same size and shape as the mold members 9 and 14, which are of the same length. Such wedge 17 functions to hold the mold members 9 and 14 in tight assembled relationship to the back and front mold sections 2 and 3, respectively, while the wedge 17 which is of the length of the mold members 9 and 14, extends to a portion of the glove form 6 intermediate the thumb and finger areas thereof and completes the mold cavity. Thus removal of the wedge 17 will permit either mold member 9 or 14 to be moved directly away from any glove form 6 produced in the mold 1 so that the design or roughened area produced on such glove form 6 will not be impaired or marred in any manner because of any sliding movement of the mold members with relation to the glove form produced.

A vent 31 is provided on the upper end of the thumb cavity 15 for release of air trapped in such a mold cavity when the mold members are assembled and the mold is filled from the bottom thereof.

It should be noted that the mold 1 has an open lower end which connects to a complete mold cavity 18 provided in the assembled mold. Preferably the front and back mold sections have corresponding knobs or bosses and recesses 19 and 20, respectively, provided therein for retaining the mold sections readily in assembled positions.

Figs. 1 through 3 best show the apparatus used in filling the mold cavity 18 with clay slip and such apparatus primarily includes control means comprising a valve 21 which has an inlet tube 22 extending therefrom for connection to a suitable supply of clay slip whereby such clay slip is supplied to the inlet tube under a desired pressure such as about 15 to 20 pounds per square inch. The valve also has a supply tube 23 extending therefrom and extending into the mold 1 and connecting to the cavity 18 thereof, whereas a drain tube 24 also is connected to and extends from the valve 21. The supply tube 23 is suitably sealed in engagement with the mold 1, as by a gasket 25 and a lock ring 26 that may be in either threaded or frictional engagement with the supply tube 23. The valve 21 has a control arm 27 connected thereto and extending therefrom for actually controlling the position of a butterfly valve 28 pivotally positioned within the valve 1 and movable from a position wherein it closes the inlet tube 22 and has to be retained in such position by manual or other pressure applied thereto, and to a position closing the drain tube 24 wherein the butterfly valve 28 is held in such position by the pressure applied to the clay slip received within and filling the mold cavity 18 and the valve 21.

Hence clay slip can be supplied to the mold cavity 18 and fill such cavity completely from the bottom thereof and be retained in the mold cavity under a desired pressure to cause the clay slip to deposit in the mold cavity 18, including filling any and all design surfaces or areas provided on the different components of the mold 1. By the use of a desired pressure, an accurate shaping is provided on the external surface of the glove form 6 in accordance with the desired design or roughened areas provided on the mold sections defining the mold cavity.

After a desired wall thickness clay deposit has been built up in the mold cavity 18, the valve 21 is turned to a drain position and air or other gas is forced into the mold cavity 18 by means of a supply tube 29 that extends to a suitable controllable source of gas supply and extends into the mold cavity 18 to a point adjacent the upper portion thereof, as indicated in Fig. 3. The upper end of such tube 29 is turned back retrorsely upon itself to facilitate breaking the vacuum on the liquid clay slip within the glove form and to start flow of the excess slip out from the bottom of the mold cavity. A conventional valve control (not shown) is connected in the tube 29.

By use of the mold 1 as disclosed herein, when the wedge 17 is removed from engagement with the remainder of the mold, then both the thumb back mold member 14, and the finger mold member 9 can be removed from engagement with the glove form 6 by movement extending normally to the surfaces of such produced glove form. The mold members 9 and 14 can be maintained parallel to the adjacent surfaces of the form, as they are moved from contact with the form 6.

It should be realized that the principles of the invention could be used for making other types of clay forms, as desired, and that such forms or articles can be baked or fired to be finished in any conventional manner to provide useful porcelain or ceramic articles.

Fig. 5 shows that small design forming areas 30 are provided on a portion of the backs of the finger cavities of the back mold section 2. The design area 11 of the front finger mold member 9 likewise extends up to and over the tops or ends of the fingers as far as they are formed in the cavity 10. When the design extends over the finger tips on the glove form 6, then it may be desirable to provide another mold section (or two) to facilitate separation of the mold from the glove form. This extra mold section might extend the width and depth of the mold 1 at the top of the finger and thumb cavities and abut against the top of a reduced height wedge. Hence, if desired, only the finger mold member 9 can be cut on the line $x$—$x$, indicated in Fig. 7, at the top of the finger cavities so that the resultant mold portion could be moved away from the fingers directly along the lines thereof and normal to the fingers ends. The top of the back mold section 2, if necessary, could be made separate from the mold section by ending at the line Y—Y (Fig. 5). However, after the mold sections 9 and 14 and the front mold member 3 are removed, then the glove form 6 can usually be separated from the mold section 2 by lifting the base portion of the form slightly and drawing the form 6 from the mold cavity in the direction of towards the bottom portion thereof.

By practice of the method of the invention, it is possible to reproduce a design formed in a mold cavity wall exactly as the pressure on the clay slip nicely forces the slip into all wall areas and surfaces. This avoids much of the special hand work required heretofore to make forms of the type described. Also, a plurality of the forms can be made relatively rapidly and inexpensively so that the objects of the invention are achieved.

While one complete embodiment of the invention has been disclosed herein, it will be appreciated that modification of this particular embodiment of the invention may be resorted to without departing from the scope of the invention as defined in the appended claims.

What I claim is:

1. A mold for use in making glove forms having roughened surfaces thereon and having a protruded thumb overhanging the palm area of the form, which mold comprises a mold section having a cavity defining the back of a glove form and the backs of four fingers thereof, a second mold section having a cavity defining the front of a glove form and a front thumb portion thereof, a mold member having a cavity defining the inner surface of the thumb portion of the form, a second mold member having a roughened surface cavity defining the front of the palm and finger areas of the form, said mold members being positioned against correlated portions of said mold sections, and a wedge member positioned intermediate said mold members to force said mold members tightly against said mold sections and complete the mold cavity.

2. A mold for use in making glove forms having designed surfaces thereon and having a protruded thumb, which mold comprises a mold section having a cavity defining the back of a glove form and four fingers thereof, a second mold section having a cavity defining the front of a glove form and a front thumb portion thereof, a thin mold member having a cavity defining the inner surface of the thumb portion of the form, a second thin mold member having a design carrying surface cavity defining the front of the palm and finger areas of the form, said mold members being positionable against correlated portions of said mold sections, and wedge means positioned intermediate said mold members to force said mold members tightly against said mold sections and close the mold cavity.

3. A mold for making a glove form having a design integrally formed therewith on a palm and finger surface thereof which mold comprises a pair of mold sections cooperating to provide a cavity defining the outlines of a glove form except for the adjacent surfaces of the thumb, palm and fingers of the form, a pair of mold members for completing the thumb and the finger portions of the mold cavity, and wedge means to secure the mold members in position and to complete the mold cavity.

4. A mold for making a glove form having a design integrally formed therewith on a finger and thumb surface thereof, which mold comprises a pair of mold sections cooperating to provide a cavity defining the outlines of a glove form except for the adjacent surfaces of the thumb, palm and fingers of the form, at least a pair of individual mold members for completing the thumb and the finger portions of the mold cavity, and wedge means to secure the mold members in position but to permit said mold members to be moved normal to a glove form produced in the mold after said wedge means are removed.

5. A mold for making a glove form having a design carrying finger surface, which form is made from porcelain or similar material, said mold comprising a pair of mold sections cooperating to provide a cavity defining the outlines of a glove form except for the top of the form and the adjacent surfaces of the thumb, palm and fingers of the form, individual mold members extending across the mold for completing the thumb and the finger portions of the mold cavity, and wedge means extending the operative length and width of said mold members to secure the mold members in position and to complete said cavity.

6. A mold for use in making glove forms having design carrying surfaces thereon and having a protruded thumb, which mold comprises a mold section having a cavity defining the back of a glove form and four fingers thereof, a second mold section having a cavity defining the front of a glove form and a front thumb portion thereof, a mold member having a design defining cavity defining the inner surface of the thumb portion of the form, a second mold member having a design defining cavity surface defining the front of the palm and the front finger areas of the form, a top mold member having design defining cavities therein for the finger ends, said top mold member being adapted to be positioned at the top end of said second mold member to complete it, said mold members being positionable against correlated portions of said mold sections, and a wedge member positioned intermediate said mold members when assembled to force said mold members tightly against said mold sections and complete the mold cavity.

7. A mold as in claim 3 wherein the inner end of said wedge means extends to the mold cavity and defines a portion thereof, said mold members being individually removable from a glove form produced in said mold cavity in a direction of movement substantially normal to the associated portions of the glove form after said wedge means is removed.

8. A mold for making a hand glove form having a design integrally formed therewith on a surface thereof and having the thumb overhanging the palm area of the form, which mold comprises a pair of mold sections cooperating to provide a cavity defining the outlines of a glove form except for the adjacent surfaces of the thumb, palm and fingers of the form, a mold member completing the thumb portion of the mold cavity, a second mold member completing the finger and palm area of the mold cavity and having a design forming surface provided thereon facing the mold cavity, and a wedge positioned between said mold members to secure them in position but to permit said mold members to be moved normal to a glove form produced in the mold after said wedge is removed, one of the sections of said mold being removable upon completion of a glove form therein prior to removal of said wedge.

9. A mold as in claim 1 wherein said second mold section is the first mold portion removed from the glove form produced in the mold.

References Cited in the file of this patent

UNITED STATES PATENTS

| | | |
|---|---|---|
| 246,161 | Ligowsky | Aug. 23, 1881 |
| 1,693,429 | Austin | Mar. 27, 1928 |
| 2,277,543 | Downs | Mar. 24, 1942 |
| 2,581,248 | Ganz | Jan. 1, 1952 |
| 2,581,249 | Ganz | Jan. 1, 1952 |